(12) United States Patent
Sasaki

(10) Patent No.: US 11,879,976 B2
(45) Date of Patent: Jan. 23, 2024

(54) CIVIL ENGINEERING WORK DATA PROCESSING DEVICE, CIVIL ENGINEERING WORK DATA PROCESSING METHOD, AND CIVIL ENGINEERING WORK DATA PROCESSING PROGRAM

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 700 days.

(21) Appl. No.: 17/023,416

(22) Filed: Sep. 17, 2020

(65) Prior Publication Data

US 2021/0096252 A1 Apr. 1, 2021

(30) Foreign Application Priority Data

Oct. 1, 2019 (JP) .................................. 2019-181240

(51) Int. Cl.
*E21B 47/04* (2012.01)
*G01S 17/50* (2006.01)
*G06T 17/00* (2006.01)
*G01S 17/894* (2020.01)
(Continued)

(52) U.S. Cl.
CPC .............. *G01S 17/50* (2013.01); *E21B 47/04* (2013.01); *E21B 47/09* (2013.01); *G01S 17/894* (2020.01); *G06T 17/00* (2013.01); *E21B 7/025* (2013.01); *E21B 2200/20* (2020.05)

(58) Field of Classification Search
CPC ...... E21B 7/025; E21B 7/022; E21B 2200/20; E21B 47/04; E21B 47/09; G01S 17/50; G01S 17/894; G06T 17/00
See application file for complete search history.

(56) References Cited

U.S. PATENT DOCUMENTS 10,118,553 B2 11/2018 Matsuo et al.
2017/0028922 A1 2/2017 Matsuo et al.
2022/0162911 A1* 5/2022 Pesola ..................... E21B 7/025

FOREIGN PATENT DOCUMENTS

CN 108345005 A 7/2018
JP H08145673 A 6/1996
JP 2000130088 A 5/2000
(Continued)

OTHER PUBLICATIONS

Toshiba Review, vol. 73, Issue 6, Nov. 2018, retrieved online from https://www.toshiba.co.jp/tech/review/abstract/2018_06.htm, 9 pgs (including translation).
(Continued)

*Primary Examiner* — Kristyn A Hall
(74) *Attorney, Agent, or Firm* — Chiesa Shahinian & Giantomasi PC

(57) ABSTRACT

A technique enables easy quantitative evaluation for drilling operations. A civil engineering work data processing device includes a positioning data receiving unit, a three-dimensional model estimating unit, and a drilled depth calculator. The positioning data receiving unit receives positioning data obtained by performing positioning using laser light, on a drilling rod. The three-dimensional model estimating unit estimates a three-dimensional model of the drilling rod, on the basis of the positioning data. The drilled depth calculator calculates a depth of a hole generated in a civil engineering work target by the drilling rod, on the basis of the estimated three-dimensional model.

3 Claims, 2 Drawing Sheets

(51) Int. Cl.
*E21B 47/09* (2012.01)
*E21B 7/02* (2006.01)

(56) References Cited

FOREIGN PATENT DOCUMENTS

| | | | |
|---|---|---|---|
| JP | 2012233353 A | 11/2012 | |
| JP | 2013091948 A | 5/2013 | |
| JP | 2017057708 A | 3/2017 | |
| JP | 2017096688 A | 6/2017 | |
| JP | 2018066659 A | 4/2018 | |
| JP | 2018071314 A | 5/2018 | |
| JP | 2019052959 A | 4/2019 | |
| WO | WO-2015107069 A1 * | 7/2015 | ............. E21B 7/025 |
| WO | 2015162710 A1 | 4/2017 | |

OTHER PUBLICATIONS

"LiDAR's MEMS Formula and Solid State Formula, Features and Explain the Difference," Autonomous Driving Lab, Oct. 12, 2018, retrieved online from https://jidounten-lab.com/y_6506, 12 pgs (including translation).

Notice of Reasons for Refusal dated Mar. 16, 2023 in connection with Japanese Patent Application No. 2019-181240, 8 pgs. (including translation).

\* cited by examiner

CIVIL ENGINEERING WORK DATA PROCESSING DEVICE, CIVIL ENGINEERING WORK DATA PROCESSING METHOD, AND CIVIL ENGINEERING WORK DATA PROCESSING PROGRAM

CROSS-REFERENCE TO RELATED APPLICATIONS

This application claims priority to Japanese Patent Application No. 2019-181240, filed Oct. 1, 2019, the disclosure of which is incorporated herein by reference in its entirety.

TECHNICAL FIELD

The present invention relates to techniques for processing civil engineering work data that is measured by using LiDAR (Light Detection and Ranging, Laser Imaging Detection and Ranging).

BACKGROUND

Techniques for obtaining three-dimensional information are publicly known. In these techniques, laser light is emitted on an object, and the laser light that is reflected back from the object is measured, whereby three-dimensional information of a point of the object reflecting the laser light is obtained. These techniques are called "LiDAR (Light Detection and Ranging, Laser Imaging Detection and Ranging)" (for example, refer to Toshiba Review Vol. 73, No. 6, November, 2018, and "*Jidounten* LAB.", Oct. 12, 2018, https://jidounten-lab.com/y_6506). Obtaining three-dimensional information of a large number of points yields point cloud data. Moreover, techniques for using LiDAR in civil engineering work have also been developed (for example, refer to Japanese Unexamined Patent Application Laid-Open No. 2000-130088).

SUMMARY

In drilling operation in a civil engineering work site, it is desired to quantitatively know the progress of the operation. In view of these circumstances, an object of the present invention is to provide a technique that enables easy quantitative evaluation for drilling operations.

The present invention provides a civil engineering work data processing device including a positioning data receiving unit, a three-dimensional model estimating unit, and a displacement calculator. The positioning data receiving unit receives positioning data obtained by performing positioning using laser light, on a member to be pushed into a civil engineering work target. The three-dimensional model estimating unit estimates a three-dimensional model of the member, on the basis of the positioning data. The displacement calculator calculates a displacement of the member relative to the civil engineering work target, on the basis of the estimated three-dimensional model.

In the present invention, the member to be pushed into the civil engineering work target is preferably a longitudinal member for drilling, and a depth of a hole that is generated in the civil engineering work target by the longitudinal member is preferably calculated by calculating the displacement.

In the present invention, the civil engineering work data processing device preferably further includes a position calculator that calculates a position at the civil engineering work target, into which the longitudinal member is to be pushed, on the basis of the estimated three-dimensional model. In the present invention, the civil engineering work data processing device preferably further includes a direction calculator that calculates a direction of the longitudinal member relative to the civil engineering work target, on the basis of the estimated three-dimensional model.

The present invention can also be understood to be an invention of a method and an invention of a program.

The present invention enables easy quantitative evaluation for drilling operations.

DETAILED DESCRIPTION

1. First Embodiment

Overview

Figure 1:
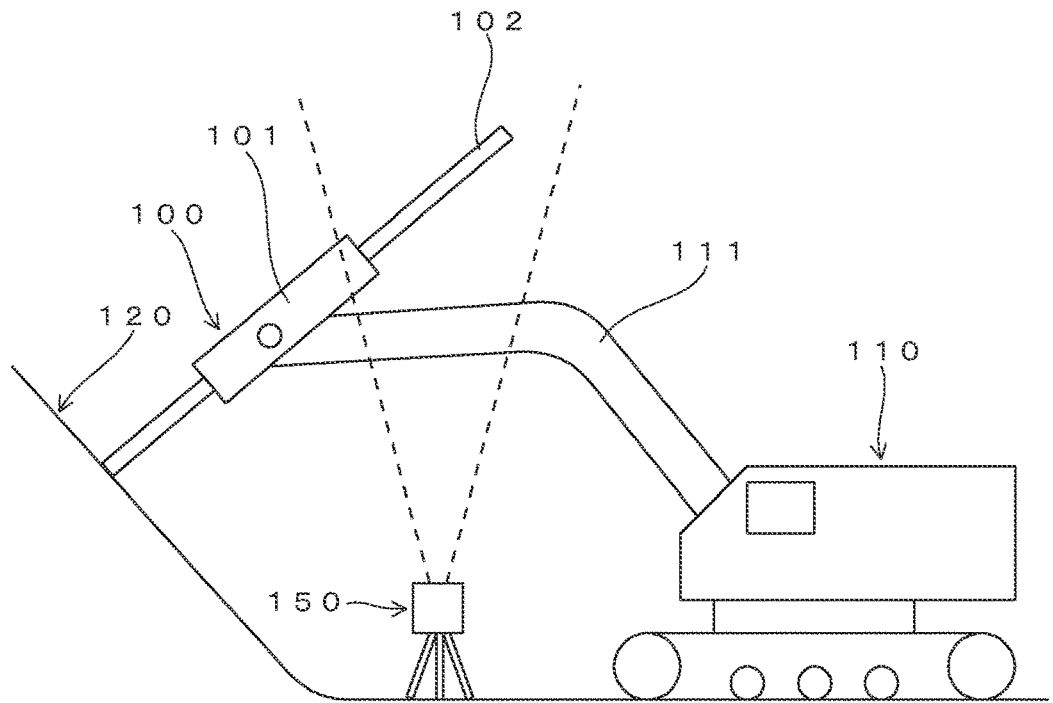
FIG. 1 shows an overview of an embodiment.

Herein, a target to be subjected to civil engineering work is a sloped ground, such as an embankment, and a slope 120 shown in FIG. 1 is used as the target. The following describes an exemplary case of drilling a ground by a drilling machine 100. A case is described of using a drilling rod as a movable part of a civil engineering work machine to be measured. Examples of the target to be subjected to civil engineering work include a ground, a cliff, a slope, a concrete surface such as a concrete wall, and a load surface. Examples of a civil engineering work machine to be used include a pile driver and a machine for ground improvement work.

FIG. 1 shows a construction machine 110 and a drilling machine 100. The construction machine 110 is a hydraulic shovel from which a bucket is removed. The drilling machine 100 is mounted on a movable arm 111 of the construction machine 110. The drilling machine 100 includes a driving unit 101 that is fixed at the movable arm 111 of the construction machine 110. A drilling rod 102 is movably mounted on the driving unit 101. The drilling rod 102 is driven by the driving unit 101 and performs drilling operation. The drilling rod 102 has a longitudinal bar shape and drills by oscillating forward and backward in the axial direction. The drilling rod 102 is movable back and forth in the axial direction relative to the driving unit 101, whereby the depth of a drilled hole is adjusted. A drill-shaped member may be used instead of the drilling rod 102.

The position to be drilled to generate a hole by the drilling rod 102, and the drilling direction of the drilling rod 102, are adjusted by adjusting a horizontal position and a vertical position of the arm 111 of the construction machine 110 and by adjusting an angle of the driving unit 101 or an angle of the drilling machine 100 relative to the arm 111. These functions are provided to the construction machine 110 and are executed in response to an operator operating the construction machine 110. The movement is performed by using an ordinary function of the construction machine 110 using the hydraulic shovel.

In this example, a trailing end of the drilling rod 102 is measured by a flash LiDAR 150. The flash LiDAR 150 includes laser distance measurement elements that are arrayed in a matrix, and the flash LiDAR 150 is configured to obtain laser point cloud data. The laser point cloud data includes points for which distances were measured by laser, and the points are distributed in a matrix of, e.g., 256×256. The flash LiDAR 150 can use any one that is selected from various commercially available types of flash LiDARs.

Exterior orientation parameters (position and attitude) in the absolute coordinate system of the flash LiDAR 150 are known, and laser point cloud data in the absolute coordinate system are obtained. The absolute coordinate system is a coordinate system used in describing GNSS data or map information. A local coordinate system having an origin at an optical origin or an optical center of the flash LiDAR 150 or another local coordinate system can also be used.

With the use of the flash LiDAR 150, laser point cloud data is obtained at a frequency of, for example, 5 Hz to 50 Hz, from a range containing the trailing end of the drilling rod 102. The trailing end of the drilling rod 102 is contained in the measurement range in order to measure a displacement in the axial direction of the drilling rod 102. The repetition frequency for obtaining laser point cloud data is not limited to the value described above and can be set in a range of the specifications of the flash LiDAR to be used.

The flash LiDAR 150 continuously measures the range containing the trailing end of the drilling rod 102 during drilling by the drilling machine 100. The measurement data of the flash LiDAR 150 is transmitted to a civil engineering work data processing device 200, which will be described below.

Civil Engineering Work Data Processing Device

Figure 2:
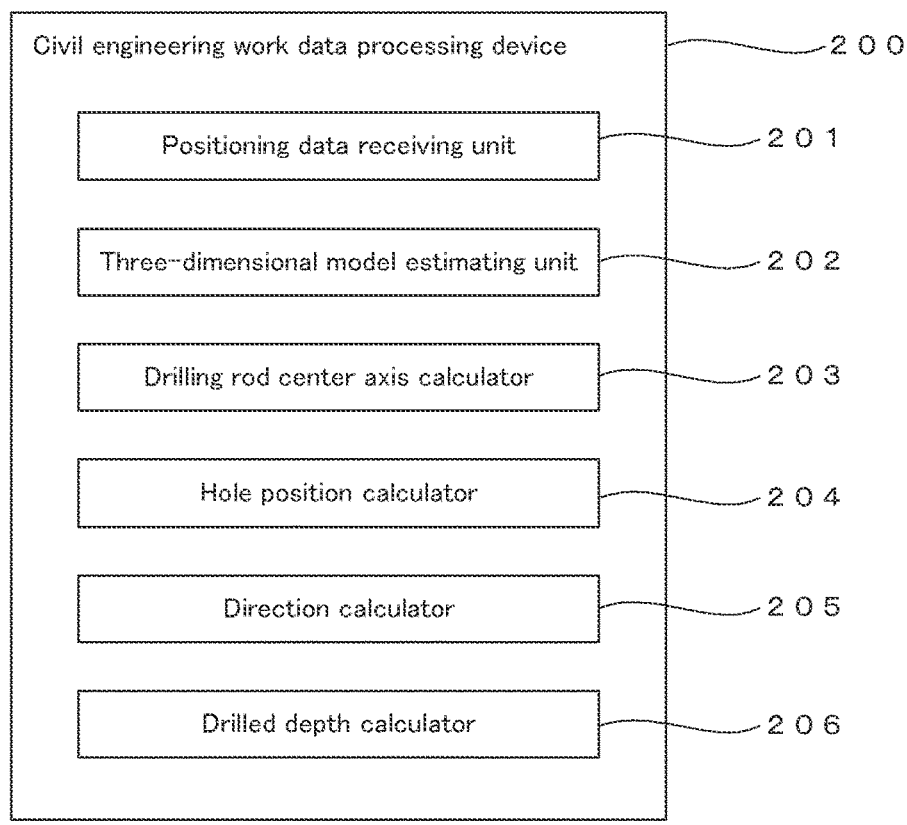
FIG. 2 is a block diagram of a civil engineering work data processing device.

FIG. 2 shows a block diagram of the civil engineering work data processing device 200. The civil engineering work data processing device 200 is constituted by using a commercially available personal computer (PC).

The civil engineering work data processing device 200 functions as a computer. The function of each functional unit of the civil engineering work data processing device 200 is implemented in such a manner that application software for implementing each functional unit shown in FIG. 2 is installed in a PC to be used, and a program constituting the application software is executed by a CPU of the PC. One or more or all of each of the functional units may be composed of each type of processor or electronic circuit. Alternatively or additionally, at least one of the functional units may be implemented by using an arithmetic operation section of an external personal computer (PC) or of a server.

The civil engineering work data processing device 200 includes a positioning data receiving unit 201, a three-dimensional model estimating unit 202, a drilling rod center axis calculator 203, a hole position calculator 204, a direction calculator 205, and a drilled depth calculator 206. In addition, the civil engineering work data processing device 200 includes a data storage, such as a semiconductor memory or a hard disk drive, a communicating unit, and a user interface unit, which are those provided to an ordinary PC.

The positioning data receiving unit 201 receives laser point cloud data from the flash LiDAR 150. The positioning data receiving unit 201 also receives data of a three-dimensional model of a target to be subjected to civil engineering work, which target is the slope 120 to be drilled in this example. This three-dimensional data is obtained by preliminarily performing laser scanning on the target, which is the slope 120 in FIG. 1, for example.

In this example, the absolute coordinate system is used as a coordinate system. That is, the laser point cloud data that is acquired from the flash LiDAR 150, and the three-dimensional model of the target to be subjected to civil engineering work, which is drilling in this example, are described in the absolute coordinate system. In the case of using a coordinate system other than the absolute coordinate system, a coordinate system to be used is selected so as to enable comparing the coordinate system that describes the laser point cloud data acquired from the flash LiDAR 150 and the coordinate system that describes the three-dimensional model of the target to be subjected to civil engineering work, which is drilling in this example.

The three-dimensional model estimating unit 202 estimates a three-dimensional model of the drilling rod 102 on the basis of the laser point cloud data obtained by the flash LiDAR 150. In this case, a point cloud behind the drilling rod 102 as viewed from the flash LiDAR 150 cannot be obtained. In view of this, on the basis of preliminarily acquired data of the shape of the drilling rod 102, the three-dimensional model of the drilling rod 102 is estimated from the laser point cloud data obtained by the flash LiDAR 150.

Specifically, point cloud data that fits to the shape of the drilling rod 102 is extracted from among the laser point cloud data obtained by the flash LiDAR 150, and a three-dimensional model that reproduces the three-dimensional shape of the drilling rod 102 is estimated. This estimated three-dimensional model of the drilling rod 102 is described in the absolute coordinate system, and similarly, the three-dimensional model of the slope 120 is also described in the absolute coordinate system. Thus, a positional relationship between the estimated three-dimensional model of the drilling rod 102 and the three-dimensional model of the slope 120 is determined.

The drilling rod center axis calculator 203 calculates the center axis of the drilling rod 102 on the basis of the estimated three-dimensional model of the drilling rod 102.

The hole position calculator 204 calculates a three-dimensional position in the absolute coordinate system of a target to be drilled to generate a hole, on the basis of the three-dimensional model of the drilling rod 102 estimated by the three-dimensional model estimating unit 202. The three-dimensional model in the absolute coordinate system of the slope 120 is already obtained, and thus, the three-dimensional position of the target to be drilled to generate a hole, in the three-dimensional model of the slope 120, can be obtained.

The direction calculator 205 calculates a direction of the drilling rod 102 on the basis of the three-dimensional model of the drilling rod 102 estimated by the three-dimensional model estimating unit 202. The three-dimensional model of the drilling rod 102 and the three-dimensional model of the slope 120 are described in the same coordinate system, and thus, the direction of the drilling rod 102 relative to the slope 120 is determined.

The drilled depth calculator 206 calculates a depth of a drilled hole on the basis of the three-dimensional model of the drilling rod 102 estimated by the three-dimensional model estimating unit 202.

Example of Processing

Figure 3:
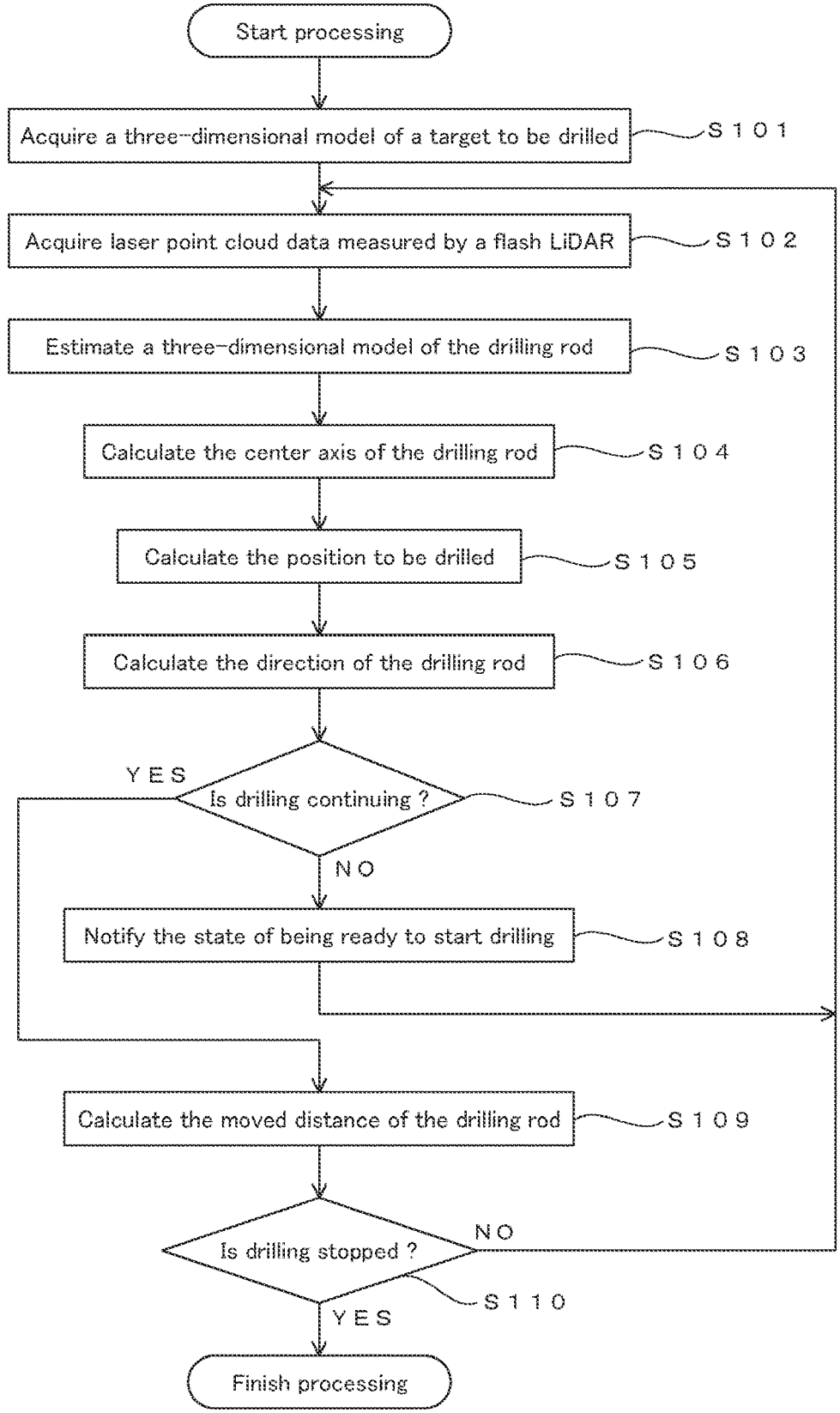
FIG. 3 is a flowchart showing an example of a processing procedure.

FIG. 3 is a flowchart showing an example of processing performed by the civil engineering work data processing device 200. The program for executing the processing in FIG. 3 is stored in the storage of the civil engineering work data processing device 200 or in an appropriate storage medium, is read therefrom, and is executed by the CPU of the PC constituting the civil engineering work data processing device 200. It is also possible to store this program in a server and download it therefrom via the internet.

First, laser scanning is performed on the slope 120 to be drilled, and a three-dimensional model in the absolute coordinate system of the slope 120 is generated. This laser scanning is performed by using an ordinary laser scanner. The three-dimensional model is generated on the basis of the laser scanning data by using a publicly known method. At this stage, it is also possible to obtain point cloud data of the slope 120 by using the flash LiDAR 150.

Then, the drilling machine 100 is positioned relative to the slope 120, whereby the construction machine 110 is ready to start drilling. In addition, area scanning on the drilling rod 102 is started by using the flash LiDAR 150, in which the exterior orientation parameters in the absolute coordinate system are obtained in advance. At this time, the trailing end of the drilling rod 102 should be contained in the measurement range. The area scanning on the drilling rod 102 is continuously performed by using the flash LiDAR 150.

In these conditions, the processing in FIG. 3 is started. First, the preliminarily generated three-dimensional model of the slope 120 to be drilled is acquired (step S101). This process is performed by the positioning data receiving unit 201.

Next, laser point cloud data that is measured by the flash LiDAR 150 is acquired (step S102). Then, a three-dimensional model of the drilling rod 102 is estimated on the basis of the laser point cloud data acquired in step S102 (step S103). Furthermore, the center axis of the drilling rod 102 in the extending direction is calculated on the basis of the three-dimensional model of the drilling rod 102 estimated in step S103 (step S104). This process calculates a straight line equation in the absolute coordinate system of the center axis of the drilling rod 102. This process is performed by the drilling rod center axis calculator 203.

Then, a position at the slope 120 to be drilled by the drilling rod 102, is calculated (step S105). This process obtains a point of intersection between the center axis of the drilling rod 102 calculated in step S104 and the three-dimensional model of the slope 120 acquired in step S101 and calculates a position to be drilled to generate a hole centered at this intersection point. This process is performed by the hole position calculator 204.

The information relating to this calculated position of the target for generating a hole is transmitted to the construction machine 110. The construction machine 110 is subjected to manual, semiautomatic, or automatic control of position and attitude of the drilling machine 100 based on this information.

Next, the direction of the drilling rod 102 is calculated (step S106). This process calculates a tilt of the center axis of the drilling rod 102 calculated in step S104. In this process, the direction or tilt of the drilling rod 102 is calculated. This process is performed by the direction calculator 205.

The information relating to the direction of the drilling rod 102 calculated in step S106 is transmitted to the construction machine 110. The construction machine 110 is subjected to manual, semiautomatic, or automatic control of position and attitude of the drilling machine 100 based on this information.

The processing in steps S102 to S106 is repeated at a predetermined cycle. The repetition frequency depends on the performance of the hardware that is used. In one example, the processing in steps S102 to S106 is repeated at a time interval of 0.1 to 1 second.

Whether the drilling operation is continuing at this stage is determined (step S107). In the case in which the drilling is continuing, the processing advances to step S109, and otherwise, in the case in which the drilling is stopped, the processing advances to step S108.

In step S108, a notification signal for notifying the state of being ready to drill is transmitted to the construction machine 110. After the processing in step S108 is performed, the processing in step S102 and the subsequent steps is repeated.

In step S109, an amount the drilling rod 102 is moved relative to the slope 120 is calculated on the basis of the three-dimensional model of the drilling rod 102 estimated in step S103 (step S109). This process calculates the amount the drilling rod 102 is moved by calculating change in the position of the trailing end of the drilling rod 102.

At this time, the depth of the drilled hole, that is, the drilled amount, is determined by calculating the amount the drilling rod 102 is moved relative to the slope 120. That is, the depth of the hole that is generated by the drilling rod 102 is determined. This process is performed by the drilled depth calculator 206.

The information relating to the depth of the hole calculated in step S109 is transmitted to the construction machine 110.

After the processing in step S109 is performed, whether drilling is stopped or whether driving of the drilling rod 102 is stopped, is determined. In the case in which the drilling is stopped, the processing is completed, and otherwise, the processing in step S102 and the subsequent steps is repeated.

Advantages

The processing in FIG. 3 enables quantitative evaluation of the state of the drilling rod 102 in real time with the use of the simple system. There may be cases in which the position or the tilt of the center axis of the drilling rod 102 deviates by, e.g., vibration during the drilling operation. Even in such cases, it is possible to measure the depth of the drilled hole, the tilt of the drilling rod 102, the displacement in a direction perpendicular to the axis of the drilling rod 102, and other factors, in real time, whereby these factors can be adjusted in real time.

In addition, in the present invention, the three-dimensional model of the drilling rod 102 during drilling is obtained, whereby the angle of drilling is easily and simply measured accurately in a case of generating a hole at an angle other than an angle perpendicular to a slope.

Other Matters

The information that is output from the civil engineering work data processing device 200 can be used by means of showing this information to an operator of the construction machine 110, and it can be used in automatic control of the construction machine 110 or in semiautomatic control in which automatic control is performed in conjunction with manual control performed by an operator with the use of this information.

In a case of having a member that moves in conjunction with the drilling rod 102, this member may be measured. The three-dimensional model of a construction target may be preliminarily obtained by aerial photogrammetry.

The present invention can also be used in detecting an amount a pile is driven in a technique of driving a pile into the ground. Examples of the target to be measured include civil engineering work apparatuses including a part that moves relative to a construction target during civil engineering work, such as a drilling apparatus and a pile driver.

2. Second Embodiment

Obtaining point cloud data from a target to be subjected to civil engineering work and obtaining point cloud data from a movable part of a civil engineering work apparatus may be performed at the same time. For example, it is assumed that a pile is to be driven into the ground. Herein, the position into which the pile is to be driven is determined in advance, and the pile is to be perpendicularly driven into the ground.

In this case, the flash LiDAR is used to obtain laser point cloud data from the ground to be subjected to civil engineering work and to obtain laser point cloud data from a movable part that moves relative to the ground, of a piling machine, at the same time. This laser point cloud data from the position, into which the pile is to be driven, is obtained each time the piling working step is performed.

3. Third Embodiment

It is also possible to use a flash LiDAR mounted with a camera. In this case, relationships of exterior orientation parameters (position and direction) of the camera and the flash LiDAR are preliminarily obtained and are known. With this configuration, a drilling rod is photographed by the camera, and the image of the drilling rod is obtained. Then, the drilling rod is recognized in the image by using an image recognition technique. Thus, information relating to a three-dimensional shape of the drilling rod is obtained. For example, information that a columnar drilling rod is used, is obtained.

Meanwhile, laser point cloud data of the drilling rod is obtained by using the flash LiDAR. Then, on the basis of the information relating to the three-dimensional shape of the drilling rod obtained by the image recognition technique, a three-dimensional model of the drilling rod is obtained from the laser point cloud data obtained by the flash LiDAR.

This method uses the image recognition technique, thereby more reliably providing a three-dimensional model of the drilling rod based on the laser point cloud data. Although a drilling rod is described as an image recognition target herein, a movable part of another type of civil engineering work apparatus may be used as an image recognition target, and a three-dimensional model of this movable part may be generated based on laser point cloud data.

In a case in which photographing by the camera and the measurement by the flash LiDAR are performed at the same time, or with a time difference therebetween of an ignorable degree, a position of a rod that is identified with the use of image recognition in a photographic image taken by the camera, can be obtained from point clouds. In this case, the position of the rod identified by image recognition is obtained from corresponding laser point cloud data. Thus, not only the feature of the three-dimensional shape of the rod, but also the position of the rod, can be obtained by using the image.

What is claimed is:

1. A civil engineering work data processing device configured to process laser point cloud data of a drilling rod, the laser point cloud data being obtained by LiDAR while the drilling rod performs drilling operation on a civil engineering work target,
    the drilling rod being configured to be driven by a driving unit,
    the drilling rod being movable back and forth in an axial direction relative to the driving unit,
    a trailing end of the drilling rod protruding from the driving unit,
    the civil engineering work data processing device comprising a processor or circuitry, the processor or circuitry being configured to:
    receive the laser point cloud data that is obtained from a range containing the trailing end of the drilling rod, which protrudes from the driving unit;
    estimate a three-dimensional model of the drilling rod on a basis of the laser point cloud data; and
    calculate a depth of a hole that is generated by the drilling rod by determining a displacement of the position of the trailing end of the drilling rod on a basis of the estimated three-dimensional model.

2. A civil engineering work data processing method for processing laser point cloud data of a drilling rod, the laser point cloud data being obtained by LiDAR while the drilling rod performs drilling operation on a civil engineering work target,
    the drilling rod being configured to be driven by a driving unit,
    the drilling rod being movable back and forth in an axial direction relative to the driving unit,
    a trailing end of the drilling rod protruding from the driving unit,
    the method comprising:
    receiving the laser point cloud data that is obtained from a range containing the trailing end of the drilling rod, which protrudes from the driving unit;
    estimating a three-dimensional model of the drilling rod on a basis of the laser point cloud data; and
    calculating a depth of a hole that is generated by the drilling rod by determining a displacement of the position of the trailing end of the drilling rod on a basis of the estimated three-dimensional model.

3. A non-transitory computer recording medium storing computer executable instructions for processing laser point cloud data of a drilling rod, the laser point cloud data being obtained by LiDAR while the drilling rod performs drilling operation on a civil engineering work target,
    the drilling rod being configured to be driven by a driving unit,
    the drilling rod being movable back and forth in an axial direction relative to the driving unit,
    a trailing end of the drilling rod protruding from the driving unit,
    the computer executable instructions that, when executed by a computer processor, cause the computer processor to:
    receive the laser point cloud data that is obtained from a range containing the trailing end of the drilling rod, which protrudes from the driving unit;
    estimate a three-dimensional model of the drilling rod on a basis of the laser point cloud data; and
    calculate a depth of a hole that is generated by the drilling rod by determining a displacement of the position of the trailing end of the drilling rod on a basis of the estimated three-dimensional model.

* * * * *